Sept. 27, 1960  H. L. PRESCOTT  2,954,488
LINE DROP COMPENSATING CIRCUIT
Filed Aug. 13, 1959
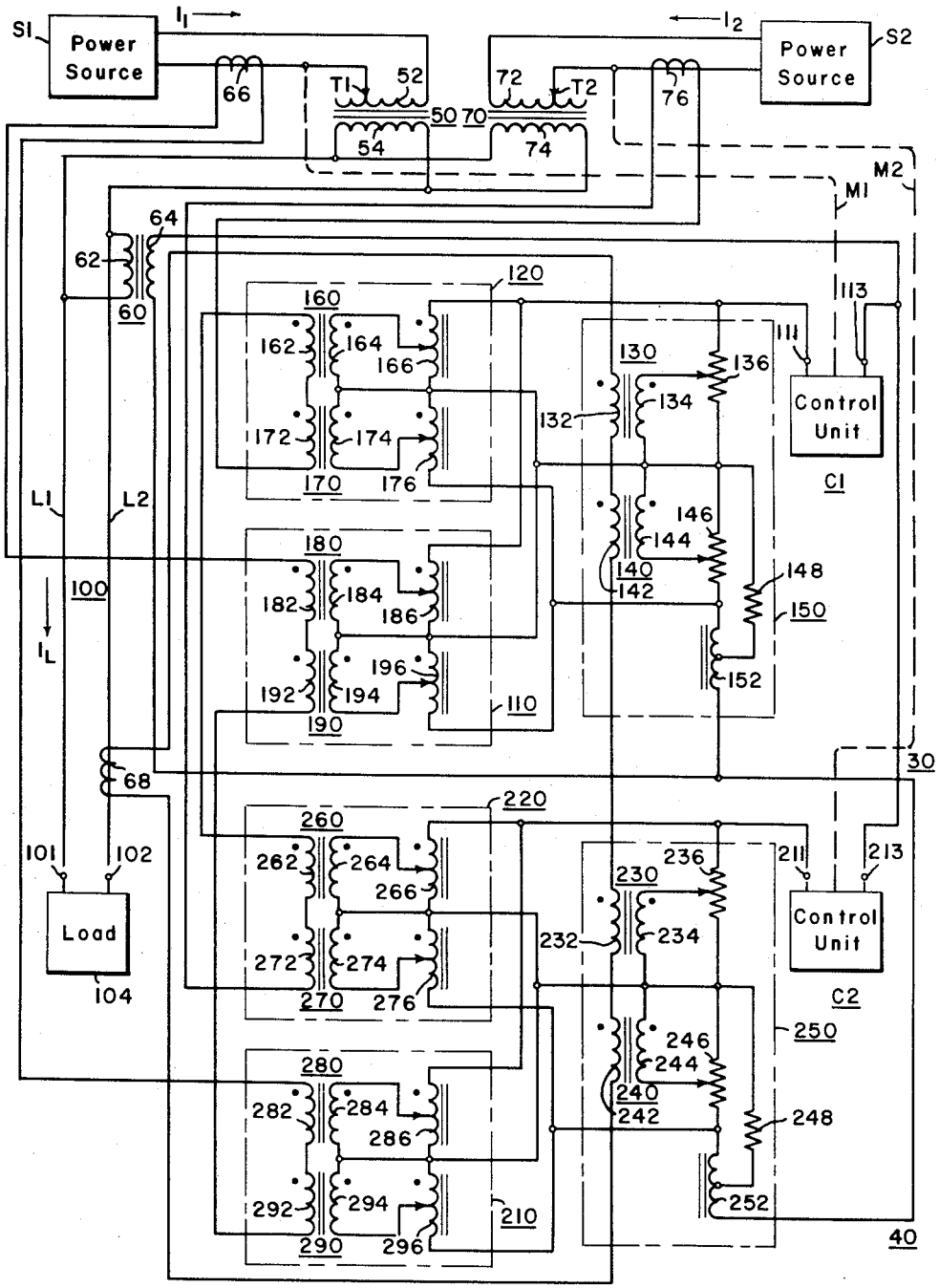
WITNESSES
INVENTOR
Herbert L. Prescott
BY
ATTORNEY

United States Patent Office 2,954,488
Patented Sept. 27, 1960

2,954,488

LINE DROP COMPENSATING CIRCUIT

Herbert L. Prescott, South Pymatuning Township, Mercer County, Pa., assignor to Westinghouse Electric Corporation, East Pittsburgh, Pa., a corporation of Pennsylvania Filed Aug. 13, 1959, Ser. No. 833,601

11 Claims. (Cl. 307—103)

This invention relates to voltage responsive devices, such as voltage regulators and voltage sensitive relays, and, more particularly, to line drop compensating circuits or means employed with such voltage responsive devices.

In controlling the operation of certain types of electrical power systems which include a plurality of interconnected alternating current power circuits, line drop compensating circuits are commonly used with voltage responsive devices, such as induction regulators, step type voltage regulators, voltage sensitive relays and tap changing transformers to provide a compensating voltage proportional to the voltage drop in an alternating current circuit between the point where the voltage responsive device is connected and some other point on the alternating current circuit, such as a load center. A conventional line drop compensating circuit ordinarily includes a resistive component and a reactive component, which are proportional to the resistance and reactance, respectively, on a particular section of an associated alternating current circuit, and a single current is normally circulated through the components of said line drop compensating circuit which is proportional to or varies with the line current of said alternating current circuit.

In order to provide special types of control in certain applications, such as the control of reverse power flow between interconnected alternating current power circuits, it is necessary to apply a plurality of compensating voltages, which are responsive to a plurality of associated independent line currents in a plurality of interconnected alternating current power circuits, to a single voltage responsive device which may be part of a voltage regulating means. In the past, the latter method of control has been accomplished by either providing at least one additional compensating circuit and a separate additional voltage responsive device or by employing rather complicated switching arrangements to switch the voltage responsive device from one compensating circuit to another. In copending application Serial No. 833,602, filed concurrently by J. C. Neupauer and assigned to the same assignee as the present application, there is also disclosed an improved compensating circuit arrangement including at least one additional compensating component connected in series circuit relation with a conventional line drop compensating circuit to provide at least one additional compensating voltage which varies with the line current in one of a plurality of interconnected alternating current power circuits which is independent of the line current to which the conventional line drop compensating circuit is responsive. In certain types of control circuits, the latter compensating circuit arrangement may make it necessary to modify the voltage responsive characteristics of the associated voltage responsive device in order to obtain satisfactory operation of said control circuit. It is therefore desirable to provide an improved means for applying a plurality of independent currents to the components of a line drop compensating circuit associated with a voltage responsive device which would make it unnecessary to modify the response characteristics of said device.

It is an object of this invention to provide a new and improved means for applying a plurality of independent currents to the components of a line drop compensating circuit associated with a voltage responsive device.

Another object of this invention is to provide a new and improved line drop compensating circuit for use with regulating means employed with a plurality of interconnected alternating current circuits.

A further object of this invention is to provide for maintaining at substantially a predetermined ratio, the load currents supplied from separate sources of electric power to a common load circuit through associated voltage regulating means while also maintaining the voltage of said load circuit at substantially a predetermined value.

Other objects of the invention will, in part, be obvious, and will, in part, appear hereinafter.

For a fuller understanding of the nature and objects of the invention, reference should be had to the following detailed deshcription taken in connection with the accompanying drawing in which the single figure diagrammatically illustrates one embodiment of this invention.

Referring now to the drawing, there is illustrated an electric power system circuit including a plurality of voltage regulating means 30 and 40 which are connected in circuit relation between separate sources of alternating current electric power S1 and S2, respectively, and a common load circuit 100, which includes the load 104. In general, the first and second voltage regulating means 30 and 40, respectively, are connected between the associated first and second sources S1 and S2, respectively, and the load circuit 100, which includes the load 104, for maintaining the voltage at the terminals 101 and 102 of the load 104 at substantially a predetermined value while simultaneously maintaining the ratio of the first and second load currents $I_1$ and $I_2$ supplied from the first and second sources S1 and S2, respectively, to the load circuit 100 at substantially a predetermined value.

More particularly, the first and second voltage regulating means 30 and 40, respectively, include the first and second tap changing or regulating transformers 50 and 70, respectively, and the associated first and second control units or circuits C1 and C2, respectively, for controlling the operation of said first and second tap changing transformers, respectively, in response to the voltage of the load circuit 100 as sensed by the potential transformer 60 and as modified by the operation of the first and second line drop compensating means or circuits 150 and 250, respectively, and by the operation of the first and second circuit means 110 and 120 and 210 and 220, respectively.

The first and second tap changing transformers 50 and 70, respectively, include the input or primary windings 52 and 72, respectively, which are connected across the first and second sources of electric power S1 and S2, respectively, the secondary windings 54 and 74, respectively, which are connected in parallel circuit relationship to the terminals 101 and 102 of the load circuit 100 by the load conductors L1 and L2, respectively, and the first and second tap changing mechanisms T1 and T2, respectively, for varying the effective number of turns in the primary windings 52 and 72, respectively, and the corresponding effective turns ratio between the primary windings 52 and 72 and the associated secondary windings 54 and 74, respectively, of the first and second tap changing transformers 50 and 70, respectively. The setting or position of each of the first and second tap changing mechanisms T1 and T2, respectively, is controlled or varied by the operation of the associated first and second control units or circuits C1 and C2, respectively, each of which includes a suitable voltage responsive or sensitive device or means (not shown) and a driving means, such as a motor, for actuating the respective tap changing mechanisms T1 and T2 through suitable mechanical means M1 and M2, respectively.

It is to be understood that in certain applications the first and second tap changing transformers 50 and 70, respectively, may be combined in a single three winding transformer having two input windings similar to the primary windings 52 and 72 of the transformers 50 and 70, respectively, connected to the sources S1 and S2, respectively, and a single output or secondary winding connected to the conductors L1 and L2 of the load circuit 100.

In order to render the inputs of the first and second control units or circuits C1 and C2, respectively, of the first and second voltage regulating means 30 and 40, respectively, responsive to the voltage of the load circuit 100 at the load conductors L1 and L2, a potential transformer 60 having a primary winding 62 and a secondary winding 64 is connected in circuit relation between said load circuit and said control units. In particular, the primary winding 62 of the potential transformer 60 is connected across the load circuit 100 at the load conductors L1 and L2. The upper end of the secondary winding 64 of the potential transformer 60 is connected to the input terminal 113 of the first control unit or circuit C1 and also to the input terminal 213 of the second control unit or circuit C2. The lower end of the secondary winding 64 of the potential transformer 60 is connected to the other input terminal 111 of the first control unit or circuit C1 through the first line drop compensating means or circuit 150 and also to the input terminal 211 of the second control unit or circuit C2 through the second line drop compensating means or circuit 250. In operation, the potential transformer 60 applies a voltage to the input terminals of each of the first and second control units or circuits C1 and C2 which is proportional to or varies with the voltage of the load circuit 100 at the load conductors L1 and L2, as modified by the voltage across the respective line drop compensating means 150 and 250, respectively, since the first and second line drop compensating means 150 and 250, respectively, are connected in series circuit relation between the lower end of the secondary winding 64 of said potential transformer and the input terminals 111 and 211, respectively, of the first and second control units or circuits C1 and C2, respectively.

The first line drop compensating means or circuit 150 comprises a resistive component or element, more specifically, a potentiometer or variable resistor 136 and a reactive component or circuit which includes the variable resistor or potentiometer 146, the tapped reactor 152, and the resistor 148. The potentiometers 136 and 146 and the tapped reactor 152 of the first line drop compensating circuit 150 are connected in series circuit relationship with one another, the series circuit being connected between the input terminal 111 of the first control unit or circuit C1 and the lower end of the secondary winding 64 of the potential transformer 60. The resistor 148 is connected in parallel circuit relationship with the potentiometer 146 and the upper portion of the tapped reactor 152 between the common terminal between the potentiometers 136 and 146 and the tapped connection of the reactor 152. Similarly, the second line drop compensating means or circuit 250 comprises a resistive component or element, more specifically a variable resistor or potentiometer 236 and a reactive component or circuit which includes the potentiometer 246, the tapped reactor 252 and the resistor 248. The potentiometers 236 and 246 and the tapped reactor 252 are also connected in series circuit relationship with one another, the series circuit being connected between the input terminal 211 of the second control unit or circuit C2 and the lower end of the secondary winding 64 of the potential transformer 60. The resistor 248 is similarly connected in parallel circuit relationship with the potentiometer 246 and the upper portion of the tapped reactor 252 between the common terminal between the potentiometers 236 and 246 and the tap connection of the tapped reactor 252.

In order to circulate a first current component through the components of each of the first and second line drop compensating means or circuits 150 and 250, respectively, as just described, which varies with or is proportional to the total load current supplied to the load circuit 100 from the first and second sources of electric power S1 and S2, respectively, the current transformer 68 is disposed in inductive relationship with the load conductor L2 of the load circuit 100 or connected in circuit relation with said load circuit to provide an output current which varies with the total load current $I_L$ of said load circuit. The first and second line drop compensating circuits 150 and 250, respectively, also each include the first and second isolating and matching current transformers 130 and 140 and 230 and 240, respectively, which are interposed or connected in circuit relation between the current transformer 68 and the resistive and reactive components, respectively, of the first and second line drop compensating circuits 150 and 250, respectively. The current transformers 130, 140, 230 and 240 include the primary windings 132, 142, 232 and 242, respectively, which are connected in series circuit relationship with one another, the series circuit being connected across the output of the current transformer 68 and the secondary windings 134, 144, 234 and 244, respectively. The output or secondary winding 134 of the current transformer 130 is connected across the lower portion of the potentiometer 136 of the first line drop compensating circuit 150 between the movable arm of said potentiometer and the common terminal between the potentiometers 136 and 146, while the output or secondary winding 144 of the current transformer 140 is connected across the upper portion of the potentiometer 146 of the first line drop compensating circuit 150 between the common terminal between the potentiometers 136 and 146 and the movable arm of the potentiometer 146. Similarly, the output or secondary winding 234 of the current transformer 230 is connected across the lower portion of the potentiometer 236 of the second line drop compensating circuit 250 between the movable arm of said potentiometer and the common terminal between the potentiometers 236 and 246, while the output or secondary winding 244 of the current transformer 240 is connected across the upper portion of the potentiometer 246 of the second line drop compensating circuit 250 between the common terminal between the potentiometers 236 and 246 and the movable arm of the potentiometer 246. The first component of current circulated through each of the resistive and reactive components of the first and second line drop compensating circuits 150 and 250, respectively, by the associated current transformers 130 and 140 and 230 and 240, respectively, therefore varies with or is proportional to the output current of the current transformer 68 which, in turn, varies with the total load current $I_L$ supplied to the load circuit 100 by the first and second sources of electric power S1 and S2, respectively.

It should be noted that the reactive component of each of the first and second line drop compensating circuits 150 and 250, respectively, is of the general type which is described in greater detail in copending application Serial No. 604,557, filed March 7, 1957, by J. T. Carleton and assigned to the same assignee as the present application. Briefly, the effective reactance of the reactive component of each of the first and second line drop compensating circuits 150 and 250, respectively, is continuously variable by the setting of the potentiometers 146 and 246, respectively, and the voltage across the reactive component of each of said line drop compensating circuits is substantially 90° out of phase with the current circulated therethrough by the associated current transformers 140 and 240, respectively.

The operation of the first and second line drop compensating circuits 150 and 250 will first be described in the absence of the first circuit means 110 and 210 and the second circuit means 120 and 220, which will be described hereinafter. The resistance of each of the potentiometers 136 and 236 of the first and second line drop compensating circuits 150 and 250, respectively, is first adjusted to be proportional to the resistance of the load circuit 100 between the load 104 and the point at which the potential transformer 60 is connected to said load circuit. Therefore, when a first current component proportional to the total load current of the load circuit 100 is circulated through the selected portions of each of the potentiometers 136 and 236, the resistive components of the line drop compensating voltages across the first and second line drop compensating circuits 150 and 250, respectively, are proportional to the resistive or in-phase component of the line drop voltage between the load 104 and the point at which the potential transformer 60 is connected to the load circuit 100. In the operation of the reactive components of the first and second line drop compensating circuits 150 and 250, respectively, it has been found that by properly proportioning the values of the components of the reactive components or circuits of said line drop compensating circuits, as described in greater detail in the last-mentioned copending application, the output voltage across the reactive circuit or component of each of said line drop compensating circuits which appear between the common terminal between the potentiometers 136 and 146 and 236 and 246, respectively, and the lower end of the tapped reactors 152 and 252, respectively, is substantially 90° out of phase with the line or load current $I_L$ of the load circuit 100 and continuously variable by the setting of each of the potentiometers 146 and 246, respectively. The output voltages across the reactive components of the first and second line drop compensating circuits 150 and 250, respectively, may therefore be adjusted by the settings of the potentiometers 146 and 246, respectively, to be proportional to the reactive component of the line drop voltage between the load 104 and the point at which the potential transformer 60 is connected to the load circuit 100.

In summary, the vector sum of the voltages across the resistive and reactive components of each of the first and second line drop compensating circuits 150 and 250, respectively, due to the first current component which is circulated through said resistive and reactive components and which varies with the total load current $I_L$ supplied to the load circuit 100 from the first and second sources of electric power S1 and S2, respectively, varies with the voltage drop in the portion of the load circuit 100 between the load 104 and the point at which the potential transformer 60 is connected to said load circuit and varies correspondingly with the latter voltage as the total load current $I_L$ supplied to the load circuit 100 varies. The vector sum of the voltages across the resistive and reactive components of each of the first and second line drop compensating circuits 150 and 250, respectively, due to the first current component just described is connected or arranged to be opposing with respect to the voltage from the potential transformer 60 which is applied to the input terminals of the associated first and second control units or circuits C1 and C2, respectively, in order that the latter control units or circuits respond to the voltage at the terminals 101 and 102 of the load 104 rather than to the voltage in the load circuit 100 at the point at which the potential transformer 60 is connected to said load circuit.

As the voltage at the terminals 101 and 102 of the load 104, as represented by the vector difference between the voltage sensed by the potential transformer 60 and the vector sum of the voltages produced across the components of each of the first and second line drop compensating means 150 and 250, respectively, by the first current component just described, varies above and below substantially a predetermined value because of changes in the total load current $I_L$ supplied to the load 104 or for any other reason, the first and second control units or circuits C1 and C2, respectively, respond to the change in voltage at the load 104 to actuate the first and second tap changing mechanisms T1 and T2, respectively, in the necessary directions to raise or lower the voltage at the load 104 and restore the latter voltage to substantially the desired predetermined value.

In order to apply additional current components which vary with the first and second load currents $I_1$ and $I_2$ supplied to the load circuit 100 from the first and second sources of electric power S1 and S2, respectively, to the resistive and reactive components of each of the first and second line drop compensating circuits 150 and 250, respectively, and in order to maintain the ratio of said first and second load currents at substantially a predetermined value, the first circuit means 110 and 210 and the second circuit means 120 and 220 are connected in circuit relation between the first and second sources of electric power S1 and S2, respectively, and the first and second line drop compensating circuits 150 and 250, respectively. In general, the additional second and third current components which are applied to each of the components of each of the first and second line drop compensating means 150 and 250, respectively, and which vary with the first and second load currents $I_1$ and $I_2$, respectively, supplied to the load circuit 100 from the first and second sources of electric power S1 and S2, respectively, are arranged to produce opposing compensating voltages across each of the components of each of the first and second line drop compensating circuits 150 and 250, respectively, which are substantially equal when the ratio of said first and second load currents is substantially at the desired predetermined value.

More particularly, in order to obtain an output current which varies with the load current $I_1$ supplied from the first source of electric power S1 to the load circuit 100, the current transformer 66 is disposed in inductive relationship with the lower conductor between said first source and the primary winding 52 of the first tap changing transformer 50. In order to circulate a current through each of the resistive and reactive components of each of the first and second line drop compensating circuits 150 and 250, respectively, which varies with the output current of the current transformer 66 and, in turn, with the first load current $I_1$, the first circuit means 110 and 210 are connected in circuit relationship between said current transformer and said first and second line drop compensating circuits, respectively. The first circuit means 110 and 210 comprise the first and second isolating and matching current transformers 180 and 190 and 280 and 290, respectively, and the associated variable autotransformers 186 and 196 and 286 and 296, respectively. The current transformers 180 and 190 and 280 and 290 of the first circuit means 110 and 210, respectively, include the primary windings 182 and 192 and 282 and 292, respectively, which are connected in series circuit relationship with one another, the series circuit being connected across the output of the current transformer 66. The current transformers 180 and 190 and 280 and 290 of the first circuit means 110 and 210, respectively, also include the secondary windings 184 and 194 and 284 and 294, respectively, which are connected across the inputs of the associated variable autotransformers 186 and 196 and 286 and 296, respectively, whose outputs are connected in parallel circuit relationship across the resistive and reactive components, more specifically, the potentiometers 136 and 146 and 236 and 246, respectively, of the first and second line drop compensating circuits 150 and 250, respectively. The variable autotransformers 186 and 196 and 286 and 296 are provided in order to vary the portions or percentages of the output currents of the associated current transformers 180 and 190 and 280 and 290, respectively, which are applied to the respective components of the first and second line drop compensating circuits 150 and 250, respectively.

Similarly, in order to obtain an output current which is proportional to or varies with the second load current $I_2$ supplied from the second source of electric power S2 to the load circuit 100, the current transformer 76 is disposed in inductive relationship with the lower conductor between said second source and the primary winding 72 of the second tap changing transformer 70. In order to circulate a current which varies with the output current of the current transformer 76 and, in turn, with the second load current $I_2$ through each of the resistive and reactive components of each of the first and second line drop compensating circuits 150 and 250, respectively, the second circuit means 120 and 220 are connected in circuit relation between said current transformer and the first and second line drop compensating circuits 150 and 250, respectively. The second circuit means 120 and 220 comprise the isolating and matching current transformers 160 and 170 and 260 and 270, respectively, and the associated variable autotransformers 166 and 176 and 266 and 276, respectively. The current transformers 160 and 170 and 260 and 270 of the second circuit means 120 and 220, respectively, include the primary windings 162 and 172 and 262 and 272, respectively, which are connected in series circuit relationship with one another, the series circuit being connected across the output of the current transformer 76. The current transformers 160 and 170 and 260 and 270 of the second circuit means 120 and 220, respectively, also include the secondary windings 164 and 174 and 264 and 274, respectively, which are connected across the inputs of the associated variable autotransformers 166 and 176 and 266 and 276, whose outputs are connected, in turn, in parallel circuit relationship with or across the resistive and reactive components, more specifically, the potentiometers 136 and 146 and 236 and 246 of the first and second line drop compensating circuits 150 and 250, respectively, in order to vary the portions or percentages of the respective output currents of said secondary windings which are applied to the respective components of the first and second line drop compensating circuits 150 and 250, respectively, for reasons for which will be explained hereinafter.

It is to be noted that, since the voltages associated with the first and second sources of electric power S1 and S2, respectively, and the voltage associated with the load circuit 100 may be different from one another in a typical application, the current transformers 66 and 76, respectively, and the current transformer 68, as well as the associated isolating and matching current transformers in the first circuit means 110 and 210 and the second circuit means 120 and 220 and in the first and second line drop compensating circuit 150 and 250, respectively, are provided for one purpose at least to match the measures of the first and second load currnets $I_1$ and $I_2$ supplied from the first and second sources S1 and S2, respectively, to the load circuit 100 and the measure of the total load current $I_L$ supplied to said load circuit and to place the measures of said load currents obtained by the respective current transformers on a common base when the corresponding current components are applied to the components of each of the first and second line drop compensating circuits 150 and 250, respectively.

The overall operation of the electric power system shown in the drawing can best be understood by considering the voltages $V_1$ and $V_2$ applied at the input terminals of the first and second control units or circuits $C_1$ and $C_2$, respectively, of the first and second voltage regulating means 30 and 40, respectively, which can be expressed by the following vector equations:

(1) $V_1 = V_L - I_L R + R(I_1 T_{1R} - I_2 T_{2R})$
$- j I_L X + j X (I_1 T_{1x} - I_2 T_{2x})$ (2) $V_2 = V_L - I_L R - R(I_1 T_{1R} - I_2 T_{2R})$
$- j I_L X - j X (I_1 T_{1x} - I_2 T_{2x})$

The following terminology is employed in the above equations:

$V_L$ = the voltage of the load circuit 100 at the point at which the primary winding 62 of the potential transformer 60 is connected to said load circuit.

$I_L$ = the total load current being supplied to the load circuit 100 from the first and second sources of electric power S1 and S2, respectively.

$R$ = the effective resistance of the resistive components of each of the first and second line drop compensating circuits 150 and 250, respectively.

$X$ = the effective reactance of the reactive component of each of the first and second line drop compensating circuits 150 and 250, respectively.

$T_{1R}$ = the setting of each of the variable autotransformers 186 and 286 expressed as a percentage or fraction of the output current of the associated current transformers 184 and 284, respectively, which is applied to the resistive components of the first and second line drop compensating circuits 150 and 250, respectively, and which varies with the first load current $I_1$.

$T_{2R}$ = the setting of the variable autotransformers 166 and 266 expressed as a percentage or fraction of the output current of the associated current transformers 164 and 264 respectively, which is applied to the resistive components of the first and second line drop compensating circuits 150 and 250, respectively, and which varies with the second load current $I_2$.

$T_{1x}$ = the setting of the variable autotransformers 196 and 296 expressed as a percentage or fraction of the output current of the associated current transformers 190 and 290, respectively, which is applied to the reactive components of the first and second line drop compensating circuits 150 and 250, respectively, and which varies with the first load current $I_1$.

$T_{2x}$ = the setting of the variable autotransformers 176 and 276 expressed as a percentage or fraction of the output current from the associated current transformers 170 and 270, respectively, which is applied to the reactive components of the first and second line drop compensating circuits 150 and 250, respectively, and which varies with the second load current $I_2$.

It is clear from an inspection of the equations 1 and 2 that the compensating voltages across the resistive and reactive components of each of the first and second line drop compensating circuits 150 and 250, respectively, as represented by the second and fourth terms, respectively, of each of said equations due to the first current component circulated through each of the components of said compensating circuits which varies with the total load current $I_L$ supplied to the load circuit 100 by the first and second sources of electric power S1 and S2, respectively, is vectorially opposing with respect to the voltage of said load circuit as sensed by the potential transformer 60 and therefore reduces the net voltage which is applied to the input terminals of each of the first and second control units or circuits C1 and C2, respectively. The vector sum of the voltages as represented by the first, second and fourth terms of each of the Equations 1 and 2, represents the voltage of the load circuit 100 at the load 104 or at the load terminals 101 and 102 since the voltage $V_L$ corresponds to the voltage sensed by the potential transformer 60 at the point where said potential transformer is connected to said load circuit and the terms $I_L R$ and $j I_L X$ represents the voltage drops across the resistive and reactive components, respectively, of each of the first and second line drop compensating circuits 150 and 250, respectively, which together correspond to the voltage drop in the load circuit 100 between the load 104 and the point at which the potential transformer 60 is connected to said load circuit.

It should also be noted from the Equations 1 and 2 that the net compensating voltages produced across the resistive and reactive components of the first line drop compensating circuit 150 by the current components circulated therethrough which vary with the first and second load currents $I_1$ and $I_2$ supplied by the first and second sources S1 and S2 to the load circuit 100, as represented by the third and fifth terms, respectively, of the Equation 1 is vectorially additive with respect to the voltage $V_L$ of the load circuit 100, as sensed by the potential transformer 60, and the net compensating voltage across the resistive and reactive components of the second line drop compensating circuit 250 due to the current components circulated therethrough which vary with the first and second load currents supplied from said first and second sources to the load circuit 100 as represented by the third and fifth terms, respectively, of the Equation 2 is vectorially opposing with respect to the voltage $V_L$ of the load circuit 100. As indicated by the third and fifth terms of each of the Equations 1 and 2, the compensating voltages produced across each of the components of each of the first and second line drop compensating circuits 150 and 250, respectively, by the currents components circulated therethrough which vary with the first load current $I_1$ and with the second load current $I_2$ supplied from the first and second sources S1 and S2, respectively, to the load circuit 100 are arranged to be opposing with respect to each other. The values of the third and fifth terms of each of the Equations 1 and 2 will depend upon the settings of the variable autotransformers 166 through 296 included in the first circuit means 110 and 210 and in the second circuit means 120 and 220 and also upon the division of load current being supplied to the load circuit 100 by the first and second sources of electric power S1 and S2, respectively, or upon the ratio of the first and second load currents $I_1$ and $I_2$, respectively, being supplied by first and second power sources, respectively, more specifically, upon the ratios of the real and reactive components, respectively, of the first and second load currents $I_1$ and $I_2$, because of the phase relationships existing between the currents circulated through the resistive and reactive components of each of the first and second line drop compensating circuits 150 and 250, respectively, which vary with the latter load currents and the corresponding compensating voltages produced thereby across the latter components of said line drop compensating circuits.

In order to obtain substantially a predetermined ratio between the real components of the first and second load currents $I_1$ and $I_2$ supplied by the first and second sources S1 and S2, respectively, the ratio of the settings of the variable autotransformers 186 and 286 and 166 and 266 which vary the portions of the measures of the first and second load currents $I_1$ and $I_2$, respectively, that are applied to the resistive components of the first and second line drop compensating circuits 150 and 250, respectively, as represented by $T_{1R}$ and $T_{2R}$, respectively, is proportioned substantially inversely to the desired ratio of the real components of the first and second load currents $I_1$ and $I_2$, respectively, being supplied to the load circuit 100 by the first and second sources S1 and S2, respectively. Similarly, the ratio of the settings of the variable autotransformers 196 and 296 and 176 and 276 which vary the portions of the measures of the first and second load currents $I_1$ and $I_2$, respectively, that are applied to the reactive components of the first and second line drop compensating circuits 150 and 250, respectively, as represented by $T_{1X}$ and $T_{2X}$, respectively, is proportioned substantially inversely to the desired ratio of the reactive components of the load currents $I_1$ and $I_2$ being supplied to the load circuit 100 by said first and second load sources. When the later relationships are satisfied, the third and fifth terms of each of the Equations 1, 2 will be substantially equal to zero when a desired division of load current between the first and second sources S1 and S2 is present in the overall electric power system shown in the drawing as expressed by the following equations:

(3) $\qquad I_1 T_{1R} - I_2 T_{2R} = 0$ (4) $\qquad I_1 T_{1X} - I_2 T_{2X} = 0$ The latter equations may be rearranged to more clearly indicate the relationship between the ratio of load currents and the corresponding respective settings of the various variable autotransformers as follows:

(5) $$\frac{I_1}{I_2} = \frac{T_{2R}}{T_{1R}}$$

(6) $$\frac{I_1}{I_2} = \frac{T_{2X}}{T_{1X}}$$

In the operation of the electrical power system shown in the drawing, the first and second control units or circuits C1 and C2, respectively, of the first and second voltage regulating means 30 and 40, respectively, are arranged to control the operation of the associated tap changing transformers 50 and 70, respectively, as well as the associated first and second tap changing mechanism T1 and T2, respectively, so as to maintain the respective input voltages $V_1$ and $V_2$ applied at the respective input terminals of said control units at substantially predetermined values. From an inspection of the Equations 1 and 2 it is clear that the input voltages $V_1$ and $V_2$ applied at the input terminals of the first and second control units C1 and C2, respectively, vary with the voltage of the load circuit 100, as sensed by the potential transformer 60, with the total load current $I_L$ being supplied to said load circuit from the first and second sources S1 and S2, respectively, and with the division of the load currents $I_1$ and $I_2$ being supplied to said load circuit from said first and second sources, respectively.

It will be assumed initially that the division of the load currents $I_1$ and $I_2$ being supplied from the first and second sources S1 and S2, respectively, is substantially at the desired ratio with respect to both the real and the reactive components of said load currents and therefore the third and fifth terms of each of the Equations 1 and 2 as expressed by the Equations 3 and 4 are substantially negligible or equal to zero. When the division of the real and the reactive components of the load currents $I_1$ and $I_2$ results in the desired ratios, the voltages $V_1$ and $V_2$ applied at the input terminals of the first and second control units C1 and C2, respectively, correspond to the voltage at the terminals 101 and 102 of the load 104 in the load circuit 100. Under the assumed operating condition, if the voltages $V_1$ and $V_2$ applied to the input terminals of the first and second control units C1 and C2, respectively, should increase or decrease with respect to the desired predetermined values at said input terminals because of a change in the voltage $V_L$ sensed by the potential transformer 60 or because of a change of the load current $I_L$ being supplied to the load circuit 100 by the first and second power sources S1 and S2, respectively, then the first and second control units C1 and C2, respectively, will actuate the tap settings selected by the associated first and second tap changing mechanism T1 and T2, respectively, to be changed on the associated first and second tap changing transformers 50 and 70, respectively, to increase or decrease the voltage $V_L$ sensed by the potential transformer 60 at the output of said first and second tap changing transformers to thereby restore the voltage at the terminals 101 and 102 the load 104 and the corresponding voltages $V_1$ and $V_2$ at the input terminals of each of said first and second control units to substantially the desired predetermined values.

If it is assumed that after the first and second control units C1 and C2, respectively, have operated to maintain the voltage at the load 104 at substantially the predetermined desired value, as well as the corresponding voltages $V_1$ and $V_2$ at the input terminals of each of said first and second control units, respectively, the first source S1 is supplying a load current $I_1$ which has a value larger than that necessary to maintain the desired ratio of the load currents $I_1$ and $I_2$ being supplied from the first and second sources S1 and S2, respectively, at the desired value, then the third and fifth terms of each of the Equations 1 and 2 will not be negligible or substantially equal to zero. Since the first power source S1 is attempting to supply a larger share of the total load current $I_L$ than desired, the quantity $I_1T_{1R}$ will be greater than the quantity $I_2T_{2R}$ and the quantity $I_1T_{1X}$ will be greater than the quantity $I_2T_{2X}$, thus increasing the net input voltage $V_1$ applied to the input terminals of the first control unit C1 and decreasing the input voltage $V_2$ applied to the input terminals of the second control unit C2 with respect to the desired predetermined voltages required at the input terminals of said first and second control units respectively, as indicated in the Equations 1 and 2. The latter increase in the input voltage $V_1$ applied at the input terminals of the first control unit C1 will cause said control unit to change the setting of said first tap changing mechanism T1 on the tap changing transformer 50 in such a direction as to decrease the load current $I_1$ being supplied from the first source S1 and the corresponding decrease in input voltage $V_2$ applied at the input terminals of the second control unit C2 will cause the latter control unit to change the setting of the tap changing mechanism T2 on the second tap changing transformer 70 in such a direction as to increase the load current $I_2$ being supplied to the load circuit 100 from the second source S2 until the ratio of the load currents $I_1$ and $I_2$ being supplied from said first and second sources, respectively, is restored to substantially the predetermined desired value. The simultaneous operation of the first and second control units C1 and C2, respectively, as just described in effectively opposite directions will quickly reduce the net compensating voltages across the resistive and reactive components of the first and second line drop compensating circuits 150 and 250, respectively, due to the currents circulated through said components which vary with the first and second load currents $I_1$ and $I_2$, respectively, to negligible values as represented by the first and third terms respectively of each of the Equations 1 and 2 to reestablish an equilibrium operating condition in the overall electric power system in which the desired ratio of load currents $I_1$ and $I_2$ is automatically maintained.

On the other hand, if it is assumed that, after the first and second control units C1 and C2 and the associated first and second tap changing transformers 50 and 70, respectively, have operated to maintain the voltage across the load circuit 100 at the terminals 101 and 102 at substantially a desired predetermined value, the second source S2 attempts to supply a load current $I_2$ which is of a value larger than that necessary to maintain the desired ratio of the load currents $I_1$ and $I_2$ being supplied from the first and second sources S1 and S2, respectively, to the load circuit 100, then the quantity $I_2T_{2R}$ will become greater than or exceed the quantity $I_1T_{1R}$ and the quantity $I_2T_{2X}$ will become greater than the quantity $I_1T_{1X}$ thus reversing the polarity of the third and fifth terms of each of the Equations 1 and 2 from the operating condition just described and decreasing the input voltage $V_1$ supplied at the input terminals of the first control unit C1 and increasing the input voltage $V_2$ applied at the input terminals of the second control unit C2 with respect to the desired predetermined input voltages at the input terminals of said first and second control units. A change in the input voltage $V_1$ at the input terminals of the first control unit C1 below the desired predetermined value will cause the first control unit C1 to actuate the associated first tap changing mechanism T1 on the first tap changing transformer 50 in such a direction as to increase the load current $I_1$ being supplied by the first power source S1 to the load circuit 100 and a change in the input voltage $V_2$ applied to the input terminals of the second control unit C2 above the desired predetermined value will cause the second control unit C2 to actuate the associated second tap changing mechanism T2 to change the tap setting on the second associated tap changing transformer 70 in such a direction as to decrease the load current $I_2$ being supplied by the second power source S2 to the load circuit 100, while still maintaining the voltage at the terminals 101 and 102 of the load 104 at substantially the desired predetermined value. Similarly, the simultaneous operation of the first and second control units C1 and C2, respectively, in the manner just described will reduce the third and fifth terms of each of the Equations 1 and 2 to negligible values and again reestablish an equilibrium operating condition in the overall electric power system in which the desired ratio of the load currents $I_1$ and $I_2$ being supplied from first and second sources S1 and S2, respectively, to the load circuit 100 is maintained at substantially a predetermined value.

It is important to note that the compensating voltages across the components of the first line drop compensating circuit 150 due to the current circulated through said components which vary with the load currents $I_1$ and $I_2$ are either vectorially additive or opposing with respect to the voltage $V_L$ sensed by the potential transformer 60 and the compensating voltages across the components of the second line drop compensating circuit 250 due to the currents circulated therethrough which vary with the load currents $I_1$ and $I_2$ are vectorially of the opposite sense with respect to the voltage $V_L$ whenever the ratio of the load currents $I_1$ and $I_2$ deviates from the desired predetermined value to thereby prevent a runaway operating condition of the regulating means 30 and 40, which might otherwise result in a conventional electrical power system of the type described.

It should also be noted that the desired ratio of the real and reactive components of each of the load currents $I_1$ and $I_2$ being supplied from the first and second sources S1 and S2, respectively, to the load circuit 100 may be adjusted by the settings of the variable autotransformers 166 to 296 after the ratios of the associated current transformers have been properly selected to obtain measures of the respective load currents on the same basis in order to obtain any desired ratio of the real or reactive components of the load currents $I_1$ and $I_2$ and that the real or reactive components of the associated load current being supplied from either of said sources may be reduced to a negligible value by the use of a circuit and apparatus as disclosed.

It is assumed that the settings $T_{1R}$, $T_{2R}$, $T_{1X}$ and $T_{2X}$ of the variable autotransformers 186 and 286, 166 and 266, 196 and 296, and 176 and 276, respectively, are selected to coordinate with the characteristics and capabilities of the sources S1 and S2 to the extent that the desired ratios of $I_1$ and $I_2$ are possible of attainment.

It is to be understood that the teachings of the invention may be embodied in other types of control circuits for controlling the operation of electrical power systems including a plurality of interconnected alternating current electric power circuits in order to apply two or more independent current components to at least one of the components of a line drop compensating circuit associated with a voltage responsive device which is responsive to the voltage of one of said alternating current circuits, said current components varying with the line current in at least two of said interconnected alternating current circuits, as required in different applications. It is also to be understood that a plurality of voltage regulating systems of the type described may be employed in polyphase electric power systems rather than in single phase electric power systems of the type used to illustrate the invention. Further, it is clear that other types of conventional voltage regulating means, such as those of the induction regulator type, may be substituted for the tap changing transformer means, as disclosed in accordance with the teachings of this invention. Finally, it is to be understood that in an electric power system as disclosed the directions of the real or reactive components of the load current flowing between at least one of the power sources connected to a common load circuit through separate voltage regulating means and said load circuit may be reversed in a particular application while maintaining a predetermined ratio of the real and reactive components of the load currents supplied by said separate sources and to provide power flow between one of said sources and another of said sources.

The apparatus embodying the teachings of this invention has several advantages. For example, two or more independent current components may be applied to at least one of the components of a line drop compensating circuit associated with a voltage responsive device which is responsive to the voltage of at least one of a plurality of interconnected alternating current circuits without requiring substantial modification of the voltage characteristics of said voltage responsive device. Another advantage is that the voltage of a load circuit which is connected to the outputs of a plurality of a voltage regulating means having inputs connected to separate sources of electric power can be maintained at substantially a predetermined value while simultaneously maintaining the ratio of the load currents being supplied by the respective sources at substantially a predetermined value.

Since numerous changes may be made in the above described apparatus and circuits and different embodiments of the invention may be made without departing from the spirit and scope thereof, it is intended that all the matter contained in the foregoing description or shown in the accompanying drawing shall be interpreted as illustrative and not in a limiting sense.

I claim as my invention:

1. In combination, a plurality of interconnected alternating current circuits each having associated therewith a line voltage and carrying a line current, first means for obtaining a voltage proportional to the line voltage of a first of said circuits, second means connected in circuit relation with said first means to be responsive to the line voltage of said first circuit, a line drop compensating circuit including a resistive component and a reactive component proportional to the resistance and to the reactance, respectively, of a portion of said first circuit, said compensating circuit being connected between said first means and said second means, third means connected in circuit relation with said first circuit and said compensating circuit for circulating therethrough a first current which varies with the line current of said first circuit to produce a voltage across said compensating circuit which varies with the voltage drop in said portion of said first circuit, and fourth means connected in parallel circuit relation with at least one of the components of said compensating circuit for circulating therethrough at least one additional current which is a measure of the line current in at least one of the other of said circuits to correspondingly modify the voltage across each parallel connected component.

2. In combination, a plurality of interconnected alternating current circuits each having associated therewith a line voltage and carrying a line current, first means for obtaining a voltage proportional to the line voltage of a first of said circuits, second means connected in circuit relation with said first means to be responsive to the line voltage of said first circuit, a line drop compensating circuit including a resistive component and a reactive component proportional to the resistance and to the reactance, respectively, of a portion of said first circuit, said compensating circuit being connected between said first means and said second means, third means connected in circuit relation with said first load circuit and said compensating circuit for circulating therethrough a first current which varies with the line current of said first circuit to produce a voltage across said compensating circuit which varies with the voltage drop in said portion of said first circuit, and fourth means connected in parallel circuit relation with at least one of the components of said compensating circuit for circulating therethrough at least one additional current which is a measure of the line current in at least one of the other of said circuits to correspondingly modify the voltage across each parallel connected component, said fifth means comprising at least one current transformer having a first winding connected in circuit relation with one of the other circuits and a second winding connected in parallel with at least one of the components of said compensating circuit.

3. In combination, a plurality of interconnected alternating current circuits each having associated therewith a line voltage and carrying a line current, a potential transformer for obtaining a voltage proportional to the line voltage of a first of said circuits, a voltage responsive device connected in circuit relation with said first means to be responsive to the line voltage of said first circuit, a line drop compensating circuit including a resistive component and a reactive component proportional to the resistance and to the reactance, respectively, of a portion of said first circuit, said compensating circuit being connected between said potential transformer and said voltage responsive device, a current transformer connected in circuit relation with said first load circuit and said compensating circuit for circulating therethrough a first current which varies with the line current of said first circuit to produce a voltage across said compensating circuit which varies with the voltage drop in said portion of said first circuit, and means connected in parallel circuit relation with at least one of the components of said compensating circuit for circulating therethrough at least one additional current which is a measure of the line current in at least one of the other of said circuits to correspondingly modify the voltage across each parallel connected component.

4. In combination, a plurality of interconnected alternating current circuits each having associated therewith a line voltage and carrying a line current, first means for obtaining a voltage proportional to the line voltage of a first of said circuits, second means connected in circuit relation with said first means to be responsive to the line voltage of said first circuit, a line drop compensating circuit including a resistive component and a reactive component proportional to the resistance and to the reactance, respectively, of a portion of said first circuit, said compensating circuit being connected between said first means and said second means, third means connected in circuit relation with said first load circuit and said compensating circuit for circulating therethrough a first current which varies with the line current of said first circuit to produce a voltage across said compensating circuit which varies with the voltage drop in said portion of said first circuit, fourth means connected in parallel circuit relation with at least one of the components of said compensating circuit for circulating therethrough at least one additional current which is a measure of the line current in at least one of the other of said circuits to correspondingly modify the voltage across each parallel connected component, and fifth means connected in circuit relation between said fourth means and each parallel connected component for varying the portion of each current which is a measure of the line current in one of the other circuits applied to each parallel connected component.

5. In combination, a plurality of interconnected alternating current circuits each having associated therewith a line voltage and carrying a line current, first means for obtaining a voltage proportional to the line voltage of a first of said circuits, second means connected in circuit relation with said first means to be responsive to the line voltage of said first circuit, a line drop compensating circuit including a resistive component and a reactive component proportional to the resistance and to the reactance, respectively, of a portion of said first circuit, said compensating circuit being connected between said first means and said second means, third means connected in circuit relation with said first load circuit and said compensating circuit for circulating therethrough a first current which varies with the line current of said first circuit to produce a voltage across said compensating circuit which varies with the voltage drop in said portion of said first circuit, fourth means connected in parallel circuit relation with at least one of the components of said compensating circuit for circulating therethrough at least one additional current which is a measure of the line current in at least one of the other of said circuits to correspondingly modify the voltage across each parallel connected component, and fifth means connected in circuit relation between said fourth means and each parallel connected component for varying the portion of each current which is a measure of the line current in one of the other circuits applied to each parallel connected component, said fifth means comprising at least one variable autotransformer.

6. In an electric power system including at least first and second voltage regulating means connected between separate sources of electric power and a common load circuit for maintaining the voltage at said load circuit at substantially a predetermined value, the combination comprising, first means connected in circuit relation between said load circuit and said regulating means for providing a voltage proportional to the voltage at said load circuit, separate line drop compensating means comprising a resistive component and a reactive component proportional to the resistance and to the reactance, respectively, of a portion of said load circuit connected in circuit relation between said first means and each of said regulating means, second means for circulating through the components of each of said line drop compensating means, a first current which varies with the total load current supplied to said load circuit by said sources to produce across each of said compensating means a voltage which varies with the voltage drop in said portion of said load circuit, the voltage to which said regulating means respond being modified by the voltage across the components of the associated line drop compensating means and third and fourth means connected in parallel circuit relation with the components of each line drop compensating means for circulating therethrough second and third currents which are measures of the first and second load currents, respectively, being supplied by said first and second sources, respectively, to said load circuit, the voltages produced by said first and second currents across said components being opposing and inversely proportional to the desired ratio of said first and second load currents, the net voltages produced across the components of each of said line drop compensating means by said second and third currents being additive in one compensating means and opposing in the other compensating means with respect to voltages produced by said first current.

7. In an electric power system including at least first and second voltage regulating means connected between separate sources of electric power and a common load circuit for maintaining the voltage at said load circuit at substantially a predetermined value, the combination comprising, a potential transformer connected in circuit relation between said load circuit and said regulating means for providing a voltage proportional to the voltage at said load circuit, separate line drop compensating means comprising a resistive component and a reactive component proportional to the resistance and to the reactance, respectively, of a portion of said load circuit connected in circuit relation between said potential transformer and each of said regulating means, a first current transformer for circulating through the components of each of said line drop compensating means, a first current which varies with the total load current supplied to said load circuit by said sources to produce across each of said compensating means a voltage which varies with the voltage drop in said portion of said load circuit, the voltage to which said regulating means respond being modified by the voltage across the components of the associated line drop compensating means and a plurality of current transformers connected in parallel circuit relation with the components of each line drop compensating means for circulating therethrough second and third currents which are measures of the first and second load currents, respectively, being supplied by said first and second sources, respectively, to said load circuit, the voltages produced by said first and second currents across said components being opposing and inversely proportional to the desired ratio of said first and second load currents, the net voltages produced across the components of each of said line drop compensating means by said second and third currents being additive in one compensating means and opposing in the other compensating means with respect to voltages produced by said first current.

8. In an electric power system including at least first and second voltage regulating means connected between separate sources of electric power and a common load circuit for maintaining the voltage at said load circuit at substantially a predetermined value, the combination comprising, first means connected in circuit relation between said load circuit and said regulating means for providing a voltage proportional to the voltage at said load circuit, separate line drop compensating means comprising a resistive component and a reactive component proportional to the resistance and to the reactance, respectively, of a portion of said load circuit connected in circuit relation between said first means and each of said regulating means, second means for circulating through the components of each of said line drop compensating means, a first current which varies with the total load current supplied to said load circuit by said sources to produce across each of said compensating means a voltage which varies with the voltage drop in said portion of said load circuit, the voltage to which said regulating means respond being modified by the voltage across the components of the associated line drop compensating means, third and fourth means connected in parallel circuit relation with the components of each line drop compensating means for circulating therethrough second and third currents which are measures of the first and second load currents, respectively, being supplied by said first and second sources, respectively, to said load circuit, the voltages produced by said first and second currents across said components being opposing and inversely proportional to the desired ratio of said first and second load currents, the net voltages produced across the components of each of said line drop compensating means by said second and third currents being additive in one compensating means and opposing in the other compensating means with respect to voltages produced by said first current, and fifth means connected between said third and fourth means and said compensating means for varying the portion of said second and third currents applied to said components of said compensating means.

9. In an electric power system including at least first and second voltage regulating means connected between separate sources of electric power and a common load circuit for maintaining the voltage at said load circuit at substantially a predetermined value, the combination comprising, a potential transformer connected in circuit relation between said load circuit and said regulating means for providing a voltage proportional to the voltage at said load circuit, separate line drop compensating means comprising a resistive component and a reactive component proportional to the resistance and to the reactance, respectively, of a portion of said load circuit connected in circuit relation between said potential transformer and each of said regulating means, a first current transformer for circulating through the components of each of said line drop compensating means, a first current which varies with the total load current supplied to said load circuit by said sources to produce across each of said compensating means a voltage which varies with the voltage drop in said portion of said load circuit, the voltage to which said regulating means respond being modified by the voltage across the components of the associated line drop compensating means and a plurality of current transformer connected in parallel circuit relation with the components of each line drop compensating means for circulating therethrough second and third currents which are measures for the first and second load currents, respectively, being supplied by said first and second sources, respectively, to said load circuit, the voltages produced by said first and second currents across said components being opposing and inversely proportional to the desired ratio of said first and second load currents, the net voltages produced across the components of each of said line drop compensating means by said second and third currents being additive in one compensating means and opposing in the other compensating means with respect to voltages produced by said first current, and fifth means connected between said third and fourth means and said compensating means for varying the portion of said second and third currents applied to said components of said compensating means.

10. In an electric power system including at least first and second voltage regulating means connected between separate sources of electric power and a common load circuit for maintaining the voltage at said load circuit at substantially a predetermined value, the combination comprising, first means connected in circuit relation between said load circuit and said regulating means for providing a voltage proportional to the voltage at said load circuit, separate line drop compensating means comprising a resistive component and a reactive component proportional to the resistance and to the reactance, respectively, of a portion of said load circuit connected in circuit relation between said first means and each of said regulating means, second means for circulating through the components of each of said line drop compensating means, a first current which varies with the total load current supplied to said load circuit by said sources to produce across each of said compensating means a voltage which varies with the voltage drop in said portion of said load circuit, the voltage to which said regulating means respond being modified by the voltage across the components of the associated line drop compensating means and third means connected in circuit relation between each of said sources and each of said line drop compensating means for circulating through the components thereof, additional currents which vary with the load currents being supplied by the associated sources to said load circuit, the additional currents through each of the components of said line drop compensating means being substantially equal and opposite when the ratio of load currents supplied from said sources to said load circuit is substantially at a predetermined value to thereby maintain said ratio substantially at said predetermined value.

11. In an electric power system, first and second voltage regulating means having inputs connected to separate sources of electric power and outputs connected to a common load circuit, first and second control means for controlling the operation of the respective regulating means in response to the voltage of said load circuit, first and second line drop compensating means each including a resistive and a reactive component connected between said load circuit and the respective control means for modifying the voltage to which each of said control means responds in accordance with a compensating voltage which varies with the voltage drop in a portion of said load circuit as the load current thereof varies, first and second transformer means connected in parallel circuit relation with each of said line drop compensating means for modifying the voltage applied to the respective control means in opposite directions in accordance with the first and second load currents, respectively, being supplied to said load circuit by said first and second sources, respectively, and first and second means connected in circuit relation between the respective sources and said first and second impedance means, respectively, for circulating therethrough currents which vary with said first and second load currents.

No references cited.